US007360572B2

(12) United States Patent
Simon

(10) Patent No.: US 7,360,572 B2
(45) Date of Patent: Apr. 22, 2008

(54) DEVICE FOR CYCLICAL WINDING OF LABEL STRIPS

(75) Inventor: Rainer Simon, Eschenburg (DE)

(73) Assignee: Convenience Food Systems Wallau GmbH & Co. KG, Biedenkopf-Wallau (DE)

( * ) Notice: Subject to any disclaimer, the term of this patent is extended or adjusted under 35 U.S.C. 154(b) by 282 days.

(21) Appl. No.: 10/495,543

(22) PCT Filed: Nov. 8, 2002

(86) PCT No.: PCT/EP02/12465

§ 371 (c)(1),
(2), (4) Date: Oct. 21, 2004

(87) PCT Pub. No.: WO03/042045

PCT Pub. Date: May 22, 2003

(65) Prior Publication Data

US 2005/0039857 A1 Feb. 24, 2005

(30) Foreign Application Priority Data

Nov. 14, 2001 (DE) ................................ 101 55 758

(51) Int. Cl.

| | |
|---|---|
| ***B29C 63/04*** | (2006.01) |
| ***B29C 65/48*** | (2006.01) |
| ***B65C 9/08*** | (2006.01) |
| ***B65H 18/10*** | (2006.01) |
| *B32B 37/12* | (2006.01) |
| *B32B 38/10* | (2006.01) |
| *B65H 18/14* | (2006.01) |

(52) U.S. Cl. ...................... 156/584; 156/538; 156/541; 242/540

(58) Field of Classification Search ................ 156/538, 156/541, 584; 242/540
See application file for complete search history.

(56) References Cited

U.S. PATENT DOCUMENTS 4,676,859 A 6/1987 Cleary, Jr. et al. .......... 156/361
5,503,702 A 4/1996 Filicicchia et al. ......... 156/249
5,865,918 A * 2/1999 Franklin et al. .............. 156/64

FOREIGN PATENT DOCUMENTS

DE 38 10 464 3/1988

* cited by examiner

*Primary Examiner*—Philip C. Tucker
*Assistant Examiner*—Sonya Mazumdar
(74) *Attorney, Agent, or Firm*—Perman & Green, LLP

(57) ABSTRACT

The invention relates to a device for the winding of label strips (17), comprising a rotary driven transport means (1), which cyclically transports the label strip (17) away after removal of the labels and a winding means (2) for the cyclical winding of the label strip transported away.

6 Claims, 2 Drawing Sheets

DEVICE FOR CYCLICAL WINDING OF LABEL STRIPS

This application claims the benefit of the earlier filed International Application No. PCT/EP02/12465, International Filing Date, 8 Nov. 2002, which designated the United States of America, and which international application was published under PCT Article 21(2) as WO Publication No. WO 03/042045 A1 and which claims priority from German Application No. DE 101 55 758.2, filed 14 Nov. 2001.

The present invention relates to a device for the winding of label strips comprising:

a rotary driven transport means, which cyclically transports the label strip away after the removal of the labels and a winding means for the cyclical winding of the label strip that has been transported away.

In addition, the present invention relates to a labelling machine, a packaging machine and a method for the cyclical winding of label strips.

Nowadays, packaging generally bears adhesive labels. These labels are transported on so-called label strips to the packaging, removed from the label strip and stuck on the packaging. The empty label strip has to be wound up after the removal of the labels. Generically, this is performed with a means for transporting the label strip and with a take-up reel onto which the label strips are wound. Since the diameter of the material being wound up continuously increases, the drive has to be variable. However, the result of this is that as the diameter of the material being wound up increases, its mass inertia is so great that the winding of the label strips takes place too slowly for high-speed packaging machines. This results in the formation of a loop and subsequently possibly to the failure of the labeller.

Therefore, it was the object of the present invention to provide a device for the winding of label strips in which, despite the changing diameter and mass inertia of the being wound up, no looping occurs.

According to the invention, the object is achieved by a device for the winding of label strips with:

a rotary driven transport means, which cyclically transports the label strip away after the removal of the labels and a winding means for the cyclical winding of the label strip that has been transported away, whereby the transport means cyclically drives the means for unwinding the label strip that has been transported away by means of a slip gear and an auxiliary gear.

The auxiliary gear transfers the torque of the transport means directly onto the winding means until the latter has achieved a certain rotational speed.

The slip gear transfers the torque of the transport means to the winding means by means of a slip clutch.

Preferably, the auxiliary gear comprises a first and a second means for the transmission of rotary movements from the transport means to the winding means, whereby the first means is arranged on a shaft in the transport means and the second means is arranged on a shaft in the winding means and the second means has a free wheel.

Also preferably, the slip gear comprises a first and a second means for the transmission of rotary movements from the transport means to the winding means, whereby the first means is arranged on a shaft in the transport means and the second means is connected to a shaft in the winding means by means of a slip clutch.

In a preferred embodiment of the present invention, the transmission ratios of the means for the transmission of rotary movements from the auxiliary gear and the slip gear are different. Preferably, the first and the second means in the auxiliary gear are dimensioned so that a step-down occurs. Also preferably, the first and the second means in the slip gear are dimensioned so that a step-up occurs.

A person skilled in the art will use known components as means for the transmission of rotary movement. However, preferably these means are toothed wheels, which are advantageously connected to each other by means of toothed belts.

In a preferred embodiment of the present invention, the first means in the slip gear has a free wheel. This embodiment has the advantage that the label strip between the transport means and the winding means is always tightly tensioned.

The slip clutch is advantageously equipped with friction disks with a static friction:sliding friction ratio of at least 1, preferably at least 3.

Surprisingly, it is possible with the present invention to wind the label strips cyclically without looping occurring between the material being wound up and the transport means, even though the diameter and inertia of the material being wound up are constantly changing. The present invention is based solely on a drive and the simplest of components so that it is simple and easy to produce.

A further aspect of the present invention is a labelling machine comprising the device according to the invention.

Another aspect of the present invention is a packaging machine comprising the labelling machine according to the invention.

Another aspect of the present invention is a method for the cyclical unwinding of label strips with a slip gear and an auxiliary gear in the means for the winding of the label strip that has been transported away, whereby the auxiliary gear supports the slip gear until the winding means achieves a specific minimum rotational speed.

This aspect of the present invention has the advantage that no loops capable of impeding the function of the labelling machine form between the material being wound up and the transport means.

The invention will now be described with reference to FIGS. 1 and 2. These explanations are by way of example only and do not restrict the general concept of the invention.

Figure 1:
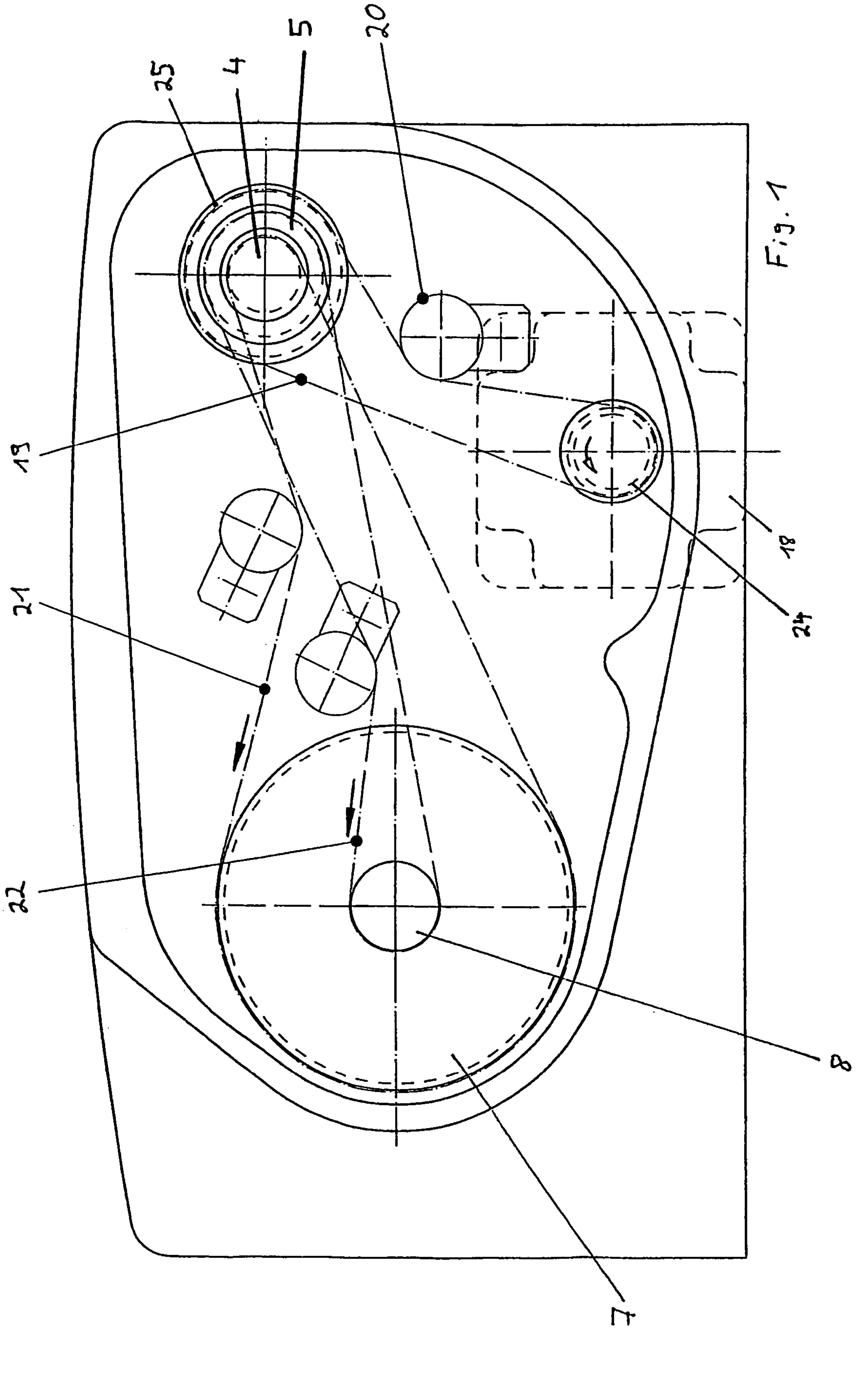
FIG. 1 is a front view of the device according to the invention.
Figure 2:
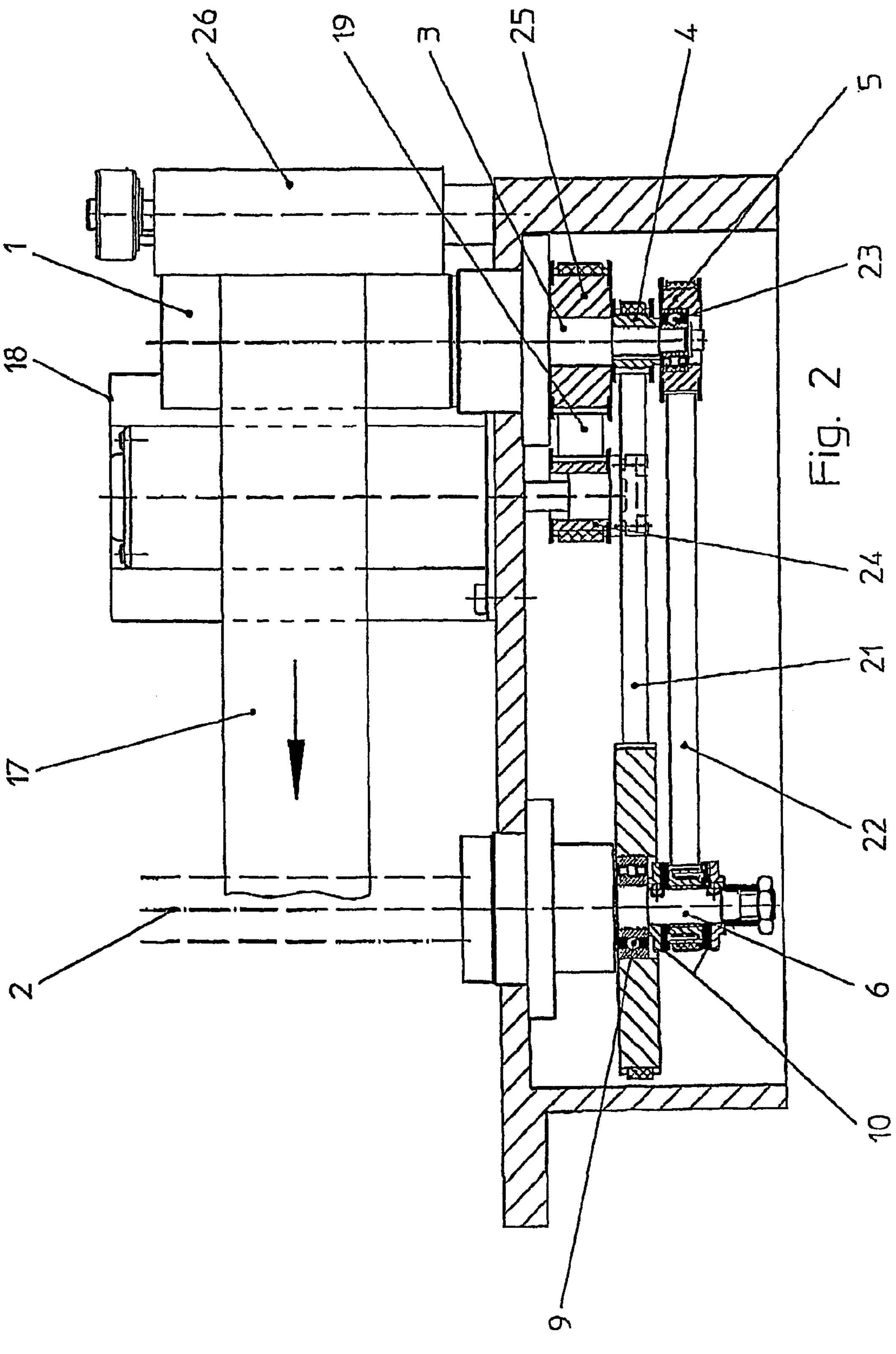
FIG. 2 is a top view of the device according to the invention.

FIGS. 1 and 2 show the device according to the invention. The label strip 17 us transported away cyclically with the transport roller 1 and wound on with the schematically illustrated take-up reel 2. The transport roller 1 is driven directly by means of the motor 18 and the toothed belt 19. The roller 20 is used to change the tension of the toothed belt 19. The transport roller 1 has a shaft 3 on which the toothed wheels 25, 4 and 5 are arranged. The take-up reel 2 also has a shaft 6 on which the toothed wheels 7 and 8 are arranged. The toothed wheels 7 and 4 are connected to each other by means of the toothed belt 21 and the toothed wheels 8 and 5 are connected to each other by means of the toothed belt 22. The toothed wheels 7 and 4 and the toothed belt 21 represent the auxiliary gear and the toothed wheels 8 and 5 and the toothed belt 22 represent the slip gear. The toothed wheel 7 has a free wheel 9 and the toothed wheel 8 has a slip clutch 10. In addition, the toothed wheel 5 optionally has a free wheel 23. A person skilled in the art will recognize that this free wheel is not absolutely necessary for the functioning of the device according to the invention.

The drive for the transport roller and/or the take-up reel functions as follows:

The motor 18 drives the shaft 3 of the transport roller directly by means of the toothed wheel 24 and the toothed belt 19 and the toothed wheel 25. This causes the roller 1 itself and the toothed wheels 4 and 5 to effect a rotary movement. The rotary movement of the toothed wheel 4 is transferred directly to the toothed wheel 7 and the shaft 6 and hence the take-up reel 2 is forcibly accelerated until it reaches a rotational speed resulting from the speed of the motor 18 and the ratio of the toothed wheels 24, 25, 4 and 7. Following this, the shaft 6 and hence the take-up reel 2 are further accelerated by the toothed wheel 8 driven by the toothed wheel 5 by means of the toothed belt 22. The free wheel 9 ensures that the toothed wheel 7 does not brake the further acceleration. The shaft 6 is accelerated until it reaches its final speed and/or until the motor is switched off. When the motor is switched off, the free wheel 23 causes the shaft 6 to continue to run until the label strip between the transport roller and take-up reel is tightly tensioned. As soon as the engine is switched back on, the label strip starts to be wound on as described above. The cycle frequency of the motor is determined by the cycle frequency of the labelling machine. The device according to the invention has the advantage that the label strip never sags between the transport roller 1 and the take-up reel and hence is never able to thread itself between the transport roller and the pressure roller 26.

The invention claimed is:

1. Device for the winding of label strips, said device comprising:

a rotary driven transport device, which cyclically transports the label strip away after removal of the labels, and a winding device for cyclical winding of the label strip that has been transported away, wherein:

the transport device is directly driven by a motor, the transport device has a shaft on which a first and a second sprocket are arranged, the winding device has a shaft on which a third and a fourth sprocket are arranged, the first sprocket on the transport device drives the third sprocket on the winding device and the second sprocket on the transport device drives the fourth sprocket on the winding device, the third sprocket has a free wheel, and the fourth sprocket has a slip clutch.

2. Device according to claim 1, wherein the first and third sprocket in comparison to the second and fourth sprocket have different transmission ratios.

3. Device according to claim 1, wherein the first and third sprocket are dimensioned so that a speed reduction occurs.

4. Device according to claim 1, wherein the second and fourth sprocket are dimensioned so that a speed increase occurs.

5. Labeling machine comprising a device according to claim 1.

6. Packaging machine comprising a labeling machine according to claim 5.

* * * * *